Figure 1:
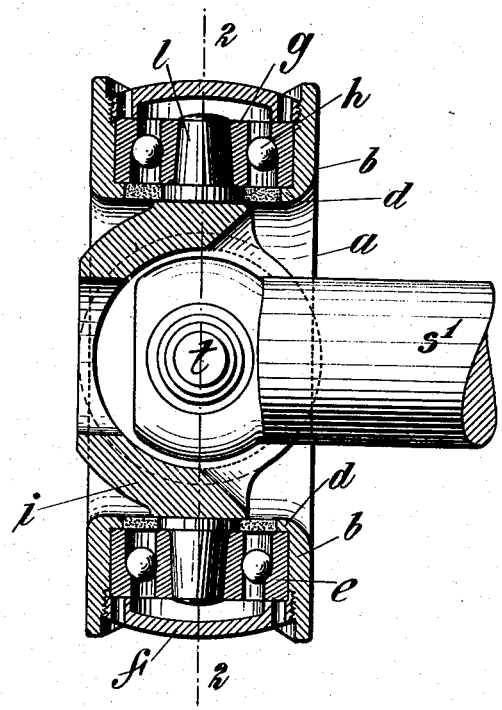

E. G. HOFFMANN.
UNIVERSAL JOINT.
APPLICATION FILED JUNE 19, 1907.

899,534.

Patented Sept. 29, 1908.
4 SHEETS—SHEET 1.

WITNESSES

INVENTOR
Ernst Gustav Hoffmann
BY
Redding, Kiddle & Greeley
ATTORNEYS

E. G. HOFFMANN.
UNIVERSAL JOINT.
APPLICATION FILED JUNE 19, 1907.
899,534.
Patented Sept. 29, 1908.
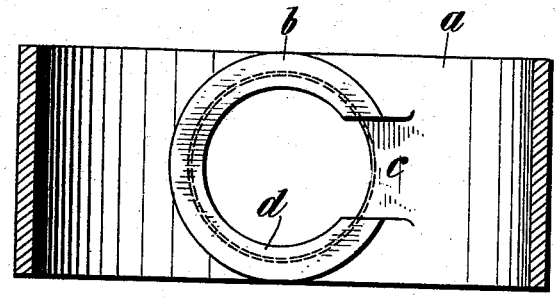
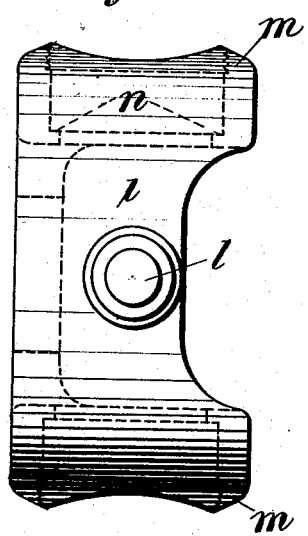
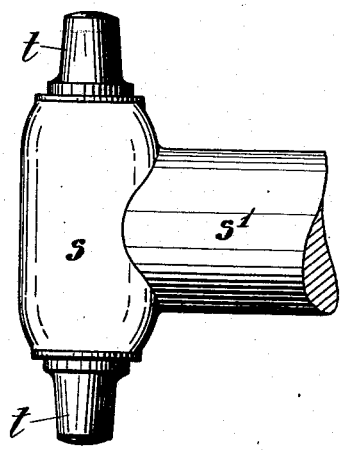
WITNESSES
INVENTOR
Ernst Gustav Hoffmann
BY
ATTORNEYS

E. G. HOFFMANN.
UNIVERSAL JOINT.
APPLICATION FILED JUNE 19, 1907.

899,534.

Patented Sept. 29, 1908.
4 SHEETS—SHEET 3.

WITNESSES

INVENTOR
Ernst Gustav Hoffmann
BY
Redding, Kiddle & Greeley
ATTORNEYS

E. G. HOFFMANN.
UNIVERSAL JOINT.
APPLICATION FILED JUNE 19, 1907.
899,534.
Patented Sept. 29, 1908.
4 SHEETS—SHEET 4.
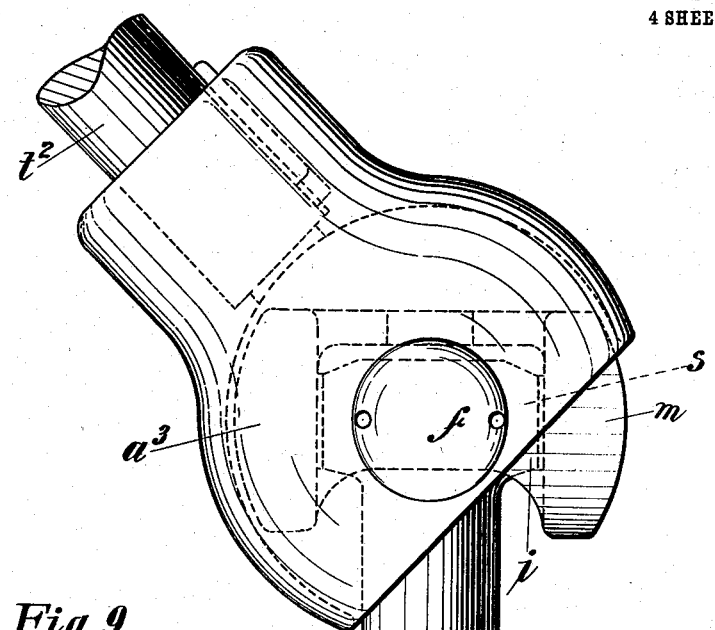
Fig. 9.
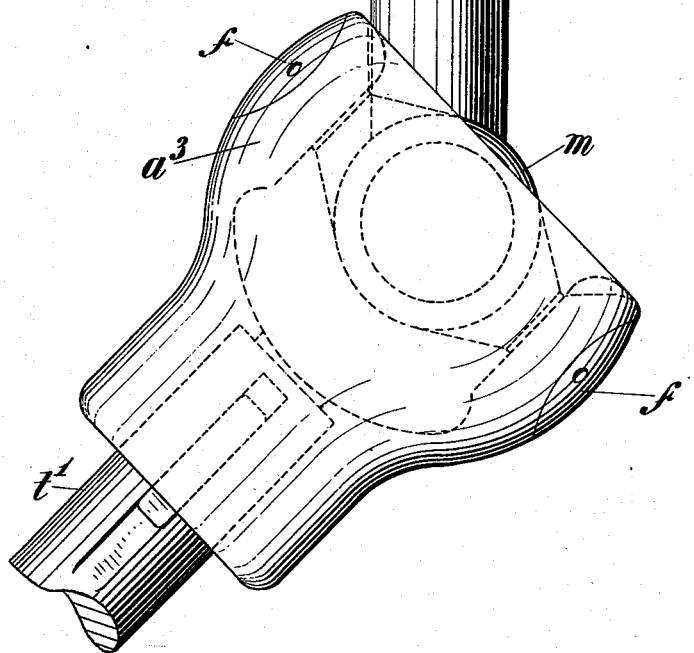
WITNESSES
INVENTOR
Ernst Gustav Hoffmann
BY
Redding, Kiddle & Greeley
ATTORNEYS

UNITED STATES PATENT OFFICE.

ERNST GUSTAV HOFFMANN, OF NEW ROCHELLE, NEW YORK.

UNIVERSAL JOINT.

No. 899,534.   Specification of Letters Patent.   Patented Sept. 29, 1908.

Application filed June 19, 1907. Serial No. 379,683.

*To all whom it may concern:*

Be it known that I, ERNST GUSTAV HOFFMANN, a citizen of the United States, residing in the city of New Rochelle, in the county of Westchester, in the State of New York, have invented certain new and useful Improvements in Universal Joints or Couplings for Shafting, &c., of which the following is a specification, reference being had to the accompanying drawings, forming a part hereof.

This invention relates to universal joints or couplings of the general character of that shown in Letters Patent of the United States No. 771,637, dated October 4th, 1904. In such universal joints or couplings, the two yoke-like members engage, both externally, the intermediate member, each of the two outer or yoke-shaped members having two cups or bosses to engage the corresponding bearing pivots of the intermediate member, the axes of the two sets of pivot bearings lying in the same plane, but intersecting at right angles. This construction prohibited great compactness, especially in the direction of the axis of the joint, and involved some difficulties in assembling the joint and in applying it in some instances.

The object of the present invention is to enable the joint to be made more compact, especially in the direction of length, and to facilitate the assembling of the members of the joint and the attachment and removal of the joint to and from the parts of the mechanism with which it is employed, particularly in cases in which the joint is to be attached, at least at one end, not to a central shaft, but to some larger body, such, for example, as the hub of a driving wheel of a motor vehicle.

In accordance with the present invention, the three members of the joint are arranged one within the other, one of the terminal members embracing the intermediate member, while the latter, in turn, embraces the other terminal member, which makes it possible to secure great compactness of construction without sacrificing flexibility. Moreover, the intermediate member is preferably provided externally with two pivot bearings to engage corresponding cups or bosses of the outer terminal member, and is provided internally with two cups or bosses to receive corresponding pivot bearings of the inner terminal member. The outer terminal member is preferably ring-like, while the inner terminal member has a single cross head and the intermediate member is box-shaped.

The invention will be more fully explained hereinafter and other desirable details of construction described, with reference to the accompanying drawings in which it is illustrated and in which—

Figure 2:
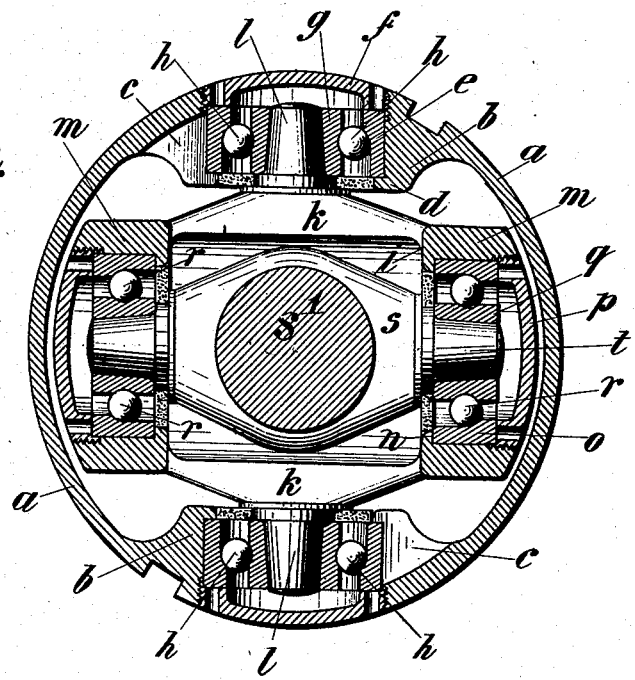
Figure 7:
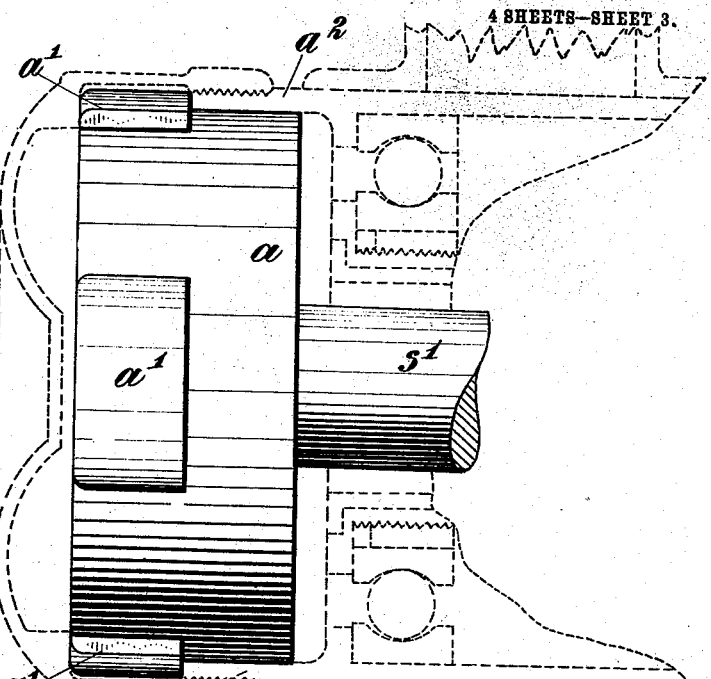
Figure 8:
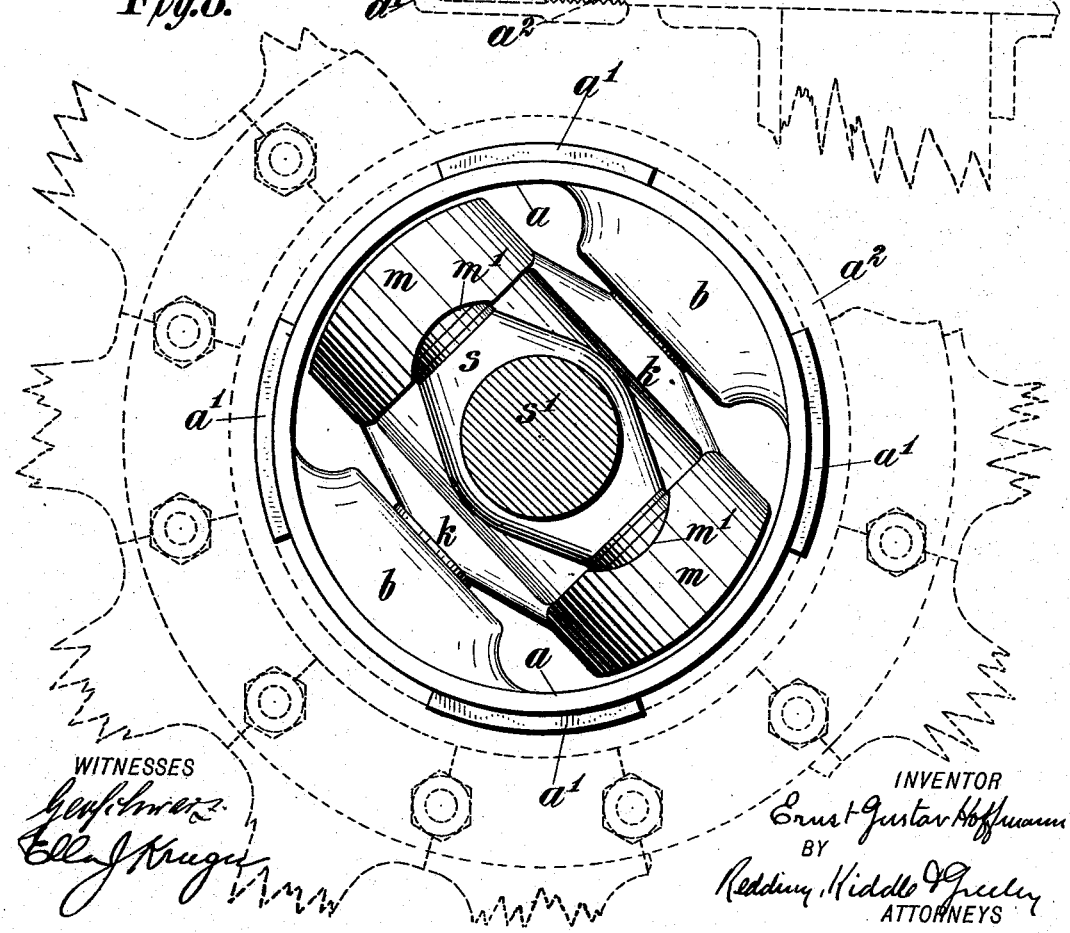

Figure 1 is a view of the improved joint showing the outer member and the intermediate member in central section and the inner member in elevation. Fig. 2 is a view in section on the plane indicated by the line 2—2 of Fig. 1, with the pivot bearings in elevation. Fig. 3 is a detailed view in section of the outer member with the bearing parts removed. Fig. 4 is a view in elevation of the intermediate member. Fig. 5 is a detailed view of one of the bearing caps. Fig. 6 is a view in elevation of the inner terminal member. Figs. 7 and 8 are views illustrating the application of the improved joint to a driving wheel of a motor vehicle, a portion of the wheel being shown in dotted lines, and Fig. 9 is a view illustrating the application of the improved joint to the coupling of two lines of shafting placed at an angle of 90°.

The outer terminal member *a* of the joint, preferably ring-like as shown is provided with diametrically opposite, inwardly projecting cups or bosses *b*, the wall of each of which, on one side, is provided with a notch or pass *c*, for a purpose presently to be described. Each boss is also provided at its inner end with an inwardly projecting shoulder *d* to form a seat for the race or ring *e* of a ball bearing. A cap *f* is threaded into the open, outer end of the boss to retain in place the outer race or ring *e* and limit the axial movement of the pivot bearing *l* to which the inner race or ring *g* is fast. The two rings or races are suitably formed to receive between them the bearing balls *h*. The intermediate member *i* of the joint is yoke-like or box-like, having upon its opposite side walls *k* bearing pivots *l* to enter the cups or bosses *b* of the outer member, having fast thereon, in the construction shown, the rings *g* of the ball bearing. The other, opposite walls of the intermediate member *i* are each formed or provided with a cup or boss *m*, similar to the cups or bosses *b* of the outer member, having an inner shoulder *n* to support the race or ring *o* of a ball bearing and threaded at the open outer end to receive a cap *p* which retains the outer race or ring *o*. An inner race or ring *q* and balls *r* complete the bearing. The walls of the bosses *m* are cut away slightly, as shown at *m'* in Fig. 8, to facilitate the assembling of the parts, as hereinafter described. The inner terminal member $s$ consists of a cross head on the end of the shaft $s'$, provided with pivot bearings $t$ which have fast thereon the rings or races $q$ and is embraced by the intermediate member $i$.

In assembling the members of the improved joint, the intermediate member is first introduced within the outer terminal member and is rotated to cause the bearing pivots $l$ thereof to enter the bosses $b$ through the notches or passes $c$ formed in the walls thereof. The balls and outer rings of the ball bearings are then introduced and secured in position by the caps $f$, thus retaining the bearing pivots of the intermediate member in the bosses of the outer member. The inner terminal member $s$, by tilting and shifting from one side to the other, is then introduced within the intermediate member, such introduction being facilitated by the slight cutting away of the walls of the bosses $m$, as indicated at $m'$ in Fig. 8, and in turn is retained in position by the insertion of the balls and rings or races of the ball bearings which are themselves retained in place by the caps $p$. In the application of the improved joint to a large body, such as the hub of a driving wheel of a motor vehicle, as indicated in Figs. 7 and 8, the outer member $a$ is conveniently provided externally with lugs $a'$ for engagement with internal notches in the end of the hub which is indicated by dotted lines at $a^2$ in Figs. 7 and 8.

It will be observed that the improved construction easily permits of a relative oscillation of 45° between the two parts which are joined or coupled, so that, as shown in Fig. 9, two lines of transmission shafting, as $t'$, $t^2$, at an angle of 90° can readily be joined or coupled by the use of two of the improved universal joints with a common connecting shaft $s^2$. The details of construction of the two universal joints thus used may be substantially the same as in the construction already described and need not be further illustrated or explained herein. The two cross heads $s$ preferably integral with the connecting shaft $s^2$ are, however, placed at right angles with respect to each other and the pivots and bosses of the intermediate members $i$ and the outer members $a^3$ are correspondingly displaced with respect to one another in the two joints so that the irregular turning motion produced by the one universal joint, operating through a great angle of deflection, shall be compensated or neutralized by the action of the other universal joint operating through the same angle of deflection, and the driven shaft be caused thereby to rotate with the same regular motion as the driving shaft.

It will be seen not only that the improved joint is exceedingly compact, especially in the direction of length, but that it fully realizes all of the desirable qualities of a universal joint, adapting itself readily to variations in alinement and having no back lash.

It will be understood that the ball bearings can be dispensed with if desired and that various other changes in details of construction and arrangement can be made without departing from the spirit of the invention.

I claim as my invention:—

1. A universal joint comprising an inner terminal member provided with pivot bearings, an intermediate member embracing the inner member and provided with internal bosses to receive the pivot bearings of the inner member and with external pivot bearings, and a ring-like outer terminal member having internal bosses with slotted walls to receive pivot bearings of the intermediate member and bearing rings to retain the pivot bearings in the slotted bosses.

2. A universal joint comprising an inner member provided with pivot bearings, an intermediate member embracing the inner member and provided with bosses to receive the pivot bearings of the inner member, bearing rings to retain the pivot bearings and caps to close the open outer ends of the bosses and retain the bearing rings, and also provided externally with bearing pivots, and an outer terminal member provided with internal bosses to receive the pivot bearings of the intermediate member, bearing rings to retain the pivot bearings and caps to close the outer open ends of the bosses and retain the bearing rings.

3. A universal joint comprising an outer member, an inner member having pivot bearings, and an intermediate member having pivot bearings, the outer member having inwardly projecting bearing bosses provided with slots adapted to permit the insertion of the pivot bearings of the intermediate member, and the intermediate member having inwardly projecting bearing bosses embracing the pivot bearings of the inner member and cut away to permit the insertion of said pivot bearings.

This specification signed and witnessed this 14th day of June, 1907.

ERNST GUSTAV HOFFMANN.

Signed in the presence of—
ELLA J. KRUGER,
AMBROSE L. O'SHEA.